United States Patent
Weingarten

[15] 3,706,216
[45] Dec. 19, 1972

[54] PROCESS FOR REINFORCING EXTRUDED ARTICLES

[72] Inventor: Joseph L. Weingarten, 144 Bellaire Avenue, Dayton, Ohio 45420

[22] Filed: Dec. 16, 1970

[21] Appl. No.: 98,812

[52] U.S. Cl. .....................72/258, 264/174, 425/114, 425/376, 425/461
[51] Int. Cl. ............................B21c 23/22, B29f 3/00
[58] Field of Search......72/258; 18/13 H, 13 A, 13 S, 18/13 T; 264/174

[56] References Cited

UNITED STATES PATENTS

| | | | |
|---|---|---|---|
| 3,289,251 | 12/1966 | Daubenfeld | 18/13 A |
| 3,227,786 | 1/1966 | Cohen | 18/13 S |
| 815,571 | 3/1906 | Williams | 18/13 A |
| 3,399,557 | 9/1968 | Lang | 72/258 |
| 2,286,922 | 6/1942 | Muller | 18/13 T |

Primary Examiner—Charles W. Lanham
Assistant Examiner—R. M. Rogers
Attorney—Harry A. Herbert, Jr. and Lloyd E. Pohl

[57] ABSTRACT

At least one reinforcing member is introduced into a pressure chamber and, from thence, into an extrusion zone through an entry port communicating between the two. Simultaneously, heated extrudent is delivered, from an extruder, to points around the reinforcing member in the extrusion zone where it encompasses the reinforcing member. Continued pressure from the extruder forces extrudent and the encompassed reinforcing member through a die in the front or downstream end of the extrusion zone. Upon emerging from the die the extrudent cools and sets around the encompassed reinforcing member and a reinforced extruded article is the result. The pressure chamber is utilized to prevent extrudent from escaping from the extrusion zone through the entry port provided for the introduction of the reinforcing member. This invention is useful in that it provides a method for incorporating reinforcing members into extruded articles.

8 Claims, 7 Drawing Figures

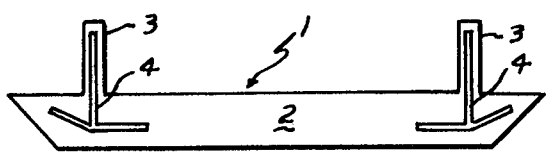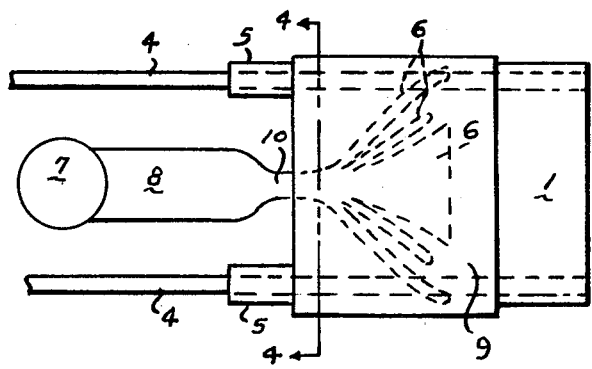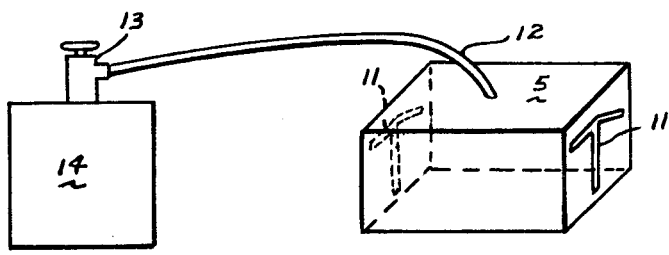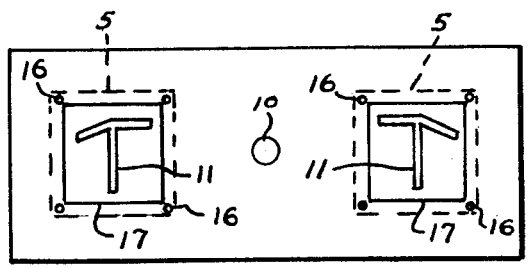

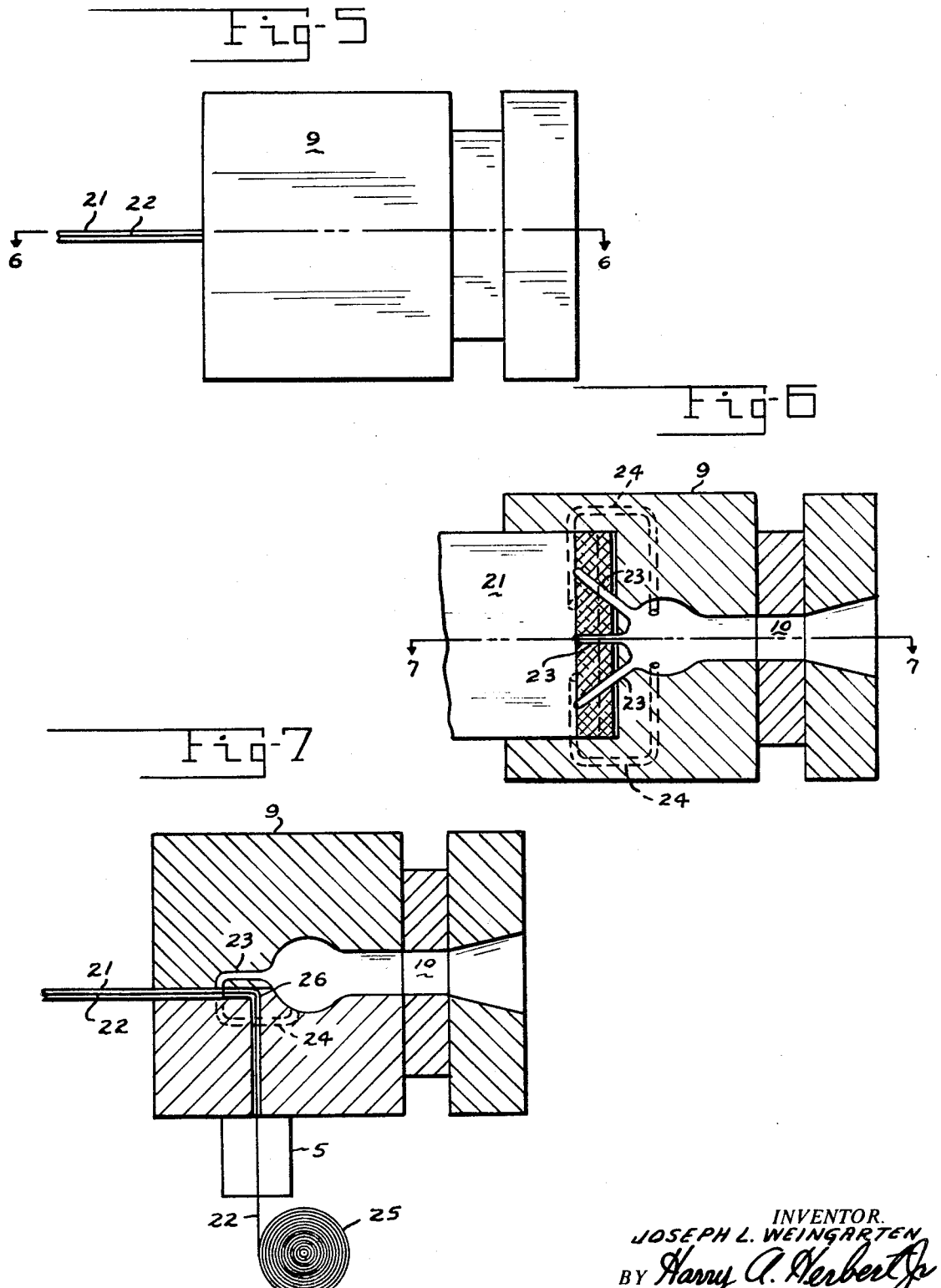

PROCESS FOR REINFORCING EXTRUDED ARTICLES

BACKGROUND OF THE INVENTION

1. Field of the Invention This invention relates to the field of extrusion. More particularly, this invention relates to a method for incorporating reinforcing members into extruded articles.

2. Description of the Prior Art

The art of extrusion is well known. With the advent of large and powerful extruders, it has been found that nearly any material which is capable of being softened by heat may be forced through a die and thus formed into an article having almost any desired cross sectional shape. Since complexly shaped articles are often formed by extrusion and since one or more portions of a complexly shaped article are often relatively weak in comparison to the rest of the article, it would be desirable to be able to incorporate reinforcing members into the inherently weaker portions of such articles. In some cases, it would be desirable to reinforce entire extruded articles.

In the prior art it has been possible to coat long, continuous lengths of wire or cable with a layer of thermoplastic polymeric material by utilizing what is known in the art as a crosshead. In such coating processes the wire or cable to be coated is introduced into the crosshead through an opening or entry port in the rear of the crosshead and heated extrudent is introduced, from an extruder, into the side of the crosshead at an angle of from about 30° to about 90° with the direction in which the wire is travelling. The wire is pulled through a die in the front of the crosshead while pressure is simultaneously applied to the extrudent to force it through the die. The simultaneous steps of pulling on the wire and pushing on the extrudent cause the extrudent to encircle the wire and a coated wire emerges from the die.

Wire coating processes differ considerably from the present invention in that they are utilized to put a coat of flexible and removable thermoplastic material on a wire (usually an electrical wire) whereas the present invention is concerned with permanently incorporating a reinforcing member in a surrounding matrix of material which may be either a thermoplastic polymeric material or a metallic material. Moreover, wire coating processes have certain problems associated with them which are solved by the present invention.

One problem associated with wire coating processes is the fact that extrudent, upon entering a crosshead from the side, at an angle of from 30° to 90° with the direction in which the wire is travelling and in which the extrudent will travel when it passes through the die, must change directions before it can actually be forced through the die. This necessary change in direction causes flow disturbances in the extrudent which often result in bubbles and weaknesses in the finally extruded coat.

Another problem associated with applying extruded coats to solid, relatively rigid articles such as wires by using a crosshead is the fact that the wire is drawn through the crosshead at a constant speed. Flow disturbances in the extrudent, resulting from its angular entry into the extrusion zone, often result in portions of the wire being left bare or uncovered because the wire travels relentlessly onward whether or not there is sufficient extrudent available to coat it.

Still another problem associated with wire coating processes is the fact that the opening or entry port provided to allow the wire to enter the crosshead from the rear must have almost exactly the same diameter as the entering wire. This is necessary in order to prevent extrudent from escaping from the crosshead through the rear entry port instead of through the die.

Wire and cable are, of course, relatively round or circular in cross section and are easily encompassed by soft, flowing extrudent. Thus, one problem that is solved by the present invention does not exist in wire coating processes. That problem is the problem of causing extrudent to flow around and completely encompass a complexly shaped reinforcing member.

SUMMARY OF THE INVENTION

It has now been found that rigid or semirigid reinforcing members may be incorporated into selected portions of extruded articles by a process which comprises the steps of:

a. introducing at least one reinforcing member into a pressure chamber and from thence into an extrusion zone through an entry port communicating the pressure chamber with the extrusion zone;

b. introducing heated extrudent into the extrusion zone from the rear or upstream end of the zone;

c. flowing the extrudent through passageways in the extrusion zone leading to points around the reinforcing member so the extrudent encompasses the reinforcing member and completely fills the extrusion zone;

d. pressurizing the pressure chamber to prevent extrudent from escaping through the entry port connecting the pressure chamber to the extrusion zone; and e. forcing the extrudent and the extrudent-encompassed reinforcing member through a die in the front or downstream end of the extrusion zone.

Among the objectives of this invention are those of:

a. having both the extrudent and the incorporated reinforcing member move in a common direction throughout the extrusion process and thus prevent flow disturbances;

b. preventing heated extrudent from flowing rearwardly from the extrusion zone through the entry port thereinto provided for the reinforcing member;

c. insuring that the reinforcing member, regardless of its cross sectional shape, is completely encompassed by extrudent; and d. forming an extruded article which has at least one permanently incorporated reinforcing member.

BRIEF DESCRIPTION OF THE DRAWING

FIG. 1 is a front elevational view of a reinforced air cargo pallet that may be formed by the method of this invention.

FIG. 2 is a plan view of apparatus which may be utilized in carrying out a process of this invention.

FIG. 3 is a perspective view of a pressure chamber which may be utilized in carrying out a process of this invention.

FIG. 4 is a view taken along line 4—4 of FIG. 2.

FIG. 5 is a side elevational view of an extrusion zone.

FIG. 6 is a view taken along line 6—6 of FIG. 5.

FIG. 7 is a view taken along line 7—7 of FIG. 6.

DESCRIPTION OF THE PREFERRED EMBODIMENTS

The accomplishment of the above-stated objectives may be most easily explained by describing the fabrication of specific reinforced articles. Therefore, the following description describes the fabrication of:

1. a reinforced air cargo pallet; and
2. a reinforced flat sheet of extruded material.

While the fabrication of two specific articles is described, it is to be understood that the techniques utilized can be applied to the manufacture of a multitude of useful articles.

A more complete understanding of the invention may be had by referring to the drawing and the following description.

FIG. 1 shows an air cargo pallet 1 which may be fabricated utilizing the process of this invention. The pallet 1 has a bed 2 for supporting cargo, two upwardly extending flanges 3 which extend along the entire length of the pallet, and two reinforcing members 4 incorporated into the flanges. The reinforced flanges are utilized to keep cargo from slipping off the edge of the pallet. They may have holes or openings drilled through them at periodic intervals along their length so that ropes or wires may be passed through and utilized to tie down cargo on the pallet. In an article such as the air cargo pallet shown in FIG. 1, the flanges are more vulnerable to strain than the bed because of torsional effects created by outwardly pressing cargo. Thus, it is desirable to incorporate reinforcing members such as those shown into the flanges.

In accordance with the present invention, a pallet of the type shown in FIG. 1 is fabricated by extrusion. The pallet itself may be formed of thermoplastic polymeric material. For example, polyethylene, polypropylene, ethylene-propylene copolymer, various polycarbonates, and many other polymeric materials may be utilized. On the other hand, metallic materials such as aluminum, magnesium, titanium, steel, and the like may form the body of the pallet. The reinforcing members are preferably metallic. If a metallic material is utilized to form the pallet itself, the material of the reinforcing members should be a different metal having a higher melting point. For example, if the pallet itself is aluminum the reinforcing members may be a higher melting metal such as titanium or steel. If the pallet is formed from thermoplastic polymeric material, the reinforcing members may be of almost any metal.

It should be emphasized here that in the method of this invention only the pallet itself is formed by extrusion. The reinforcing members are not extruded but are incorporated into the pallet by being passed through an extrusion zone along with the extrudent as the pallet is being formed.

FIG. 2 is a plan view of apparatus which may be utilized in carrying out the process of this invention in fabricating a reinforced air cargo pallet of the type shown in FIG. 1. In FIG. 2, a partially completed air cargo pallet 1 is protruding from a die positioned in the front or downstream end of extrusion zone 9. The die from which the pallet is protruding has a cross sectional shape which will produce a pallet having a bed and flanges of the type shown in FIG. 1.

Reinforcing members 4 are shown entering extrusion zone 9 after passing through pressure chambers 5. The reinforcing members extend completely through the extrusion zone and are incorporated into the flanges of the partially completed pallet as it emerges from the die. A conventional extruder 8 having a hopper 7 and a passageway 10 through which extrudent is delivered to the extrusion zone is shown. Passageway 10 branches into a series or plurality of smaller passageways 6 within the extrusion zone. Passageways 6 are in the form of channels, including a central channel flared at its end and channels leading to the outside of the extrusion zone adjacent to the reinforcing members. Passageways 6 are designed to deliver heated extrudent to points around reinforcing members 4 and all points therebetween in order to insure a smooth, complete extrusion in which the reinforcing members become completely incorporated into the final article.

In carrying out an extrusion of a pallet according to this invention, the reinforcing members are introduced into the extrusion zone through entry ports or openings in both ends of pressure chambers 5 and in the rear of the extrusion zone which communicates it with the pressure chamber. At the beginning of a process and prior to actually delivering any extrudent to the extrusion zone, the reinforcing members which are long, essentially continuous pieces of reinforcing material are inserted through the pressure chamber and through the extrusion zone until their forward ends protrude slightly through the die in the front of the extrusion zone. Then the pressure chambers are activated. Finally, extrudent is delivered from the extruder through passageways 10 and, from thence, through passageways 6 to points around the reinforcing members. The extrusion zone fills with extrudent as more and more material enters from the extruder. Before any material actually leaves the extrusion zone through the die, considerable pressure is built up therein by the extrudent pressing on the walls of the zone. This pressure tends to cause the extrudent to escape from the zone, not only through the die but through the upstream entry ports. Pressure, exerted by the pressure chambers, prevents extrudent from escaping through the entry ports and keeps the extrudent flowing in a forward direction.

When the extrusion zone is filled, the actual extrusion through the die begins. Pressure exerted on the reinforcing members by the surrounding extrudent causes the reinforcing members to be carried forward through the die along with the extrudent. Thus, when movement of extrudent through the die begins, it is not necessary to apply any outside force to the reinforcing members to cause them to move through the die.

What happens to the reinforced extruded article once it leaves the die depends, of course, upon the material being extruded. Certain materials such as thermoplastic polymeric materials require artificial cooling, for example, by passing them through a water bath to cause them to set in the desired cross sectional shape. Other materials immediately cool and set in the desired shape upon being exposed to the cool air outside the extrusion zone. The process of this invention produces a long article, the length of which is determined by the length of the reinforcing members and the amount of material fed through the extruder. Thus, the article may be picked up by a conveyor belt and carried away for further processing, e.g., to be cut into desired lengths. Alternatively, cutting means may be mounted immediately in front of the die to sever suitable lengths as they emerge from the die.

FIG. 3 is a perspective view of a pressure chamber 5 suitable for use with reinforcing members having the cross sectional shape shown in FIG. 1. Pressure chamber 5 has ports 11 cut in the two ends through which the reinforcing members pass. The ports are shown as having a cross sectional shape similar to that of the reinforcing members illustrated in FIG. 1. The shape of the ports depends upon the shape of the reinforcing member which is to pass through. A pressure hose 12 is attached at one end to the pressure chamber and, at the other end, to a valve 13 which, in turn, is connected to a pressurizing means 14. Pressure may be provided in many ways. For example, pressurizing means 14 may be a compresser. Or it may be a pressure tank containing pressurizing gas.

If gas is used as the pressurizing material, the particular gas used must depend upon the identity of the reinforcing material. In some cases, compressed air may be used. In other cases, where exposure to compressed air might have an adverse effect upon the material of the reinforcing members, an inert gas such as nitrogen should be used.

The amount of pressure provided depends upon the nature of the extrudent and how much pressure must be exerted to force the extrudent through the die. If an easily extrudible material such as thermoplastic resin is being extruded, pressures only slightly greater than atmospheric in pressure tank 5 may be sufficient to prevent extrudent from escaping through the entry port which connects the pressure chamber to the extrusion zone. On the other hand, if the material being extruded is difficult to extrude and great pressures build up within the extrusion zone and tend to force extrudent through the entry port, great pressures must also be utilized in pressure chamber 5. In some cases, pressures of several thousand pounds per square inch are required for extrusion. In these cases, the pressure in pressure chamber 5 must also be maintained at several thousand pounds per square inch. Thus, it may be seen that the design of the pressure chamber and the means utilized to deliver pressure to the pressure chamber must depend upon the particular material which is to be extruded. Of course, extremely strong pressure chambers and pressurizing means capable of providing great pressures may be utilized whether they are actually required or not. Thus, pressure chambers may be fabricated from any suitable material, such as stainless steel or any other material capable of withstanding high pressure, and compressers capable of delivering pressures up to several thousand pounds per square inch may be utilized in any process involving the techniques of this invention.

FIG. 4 is a view taken along line 4—4 of FIG. 2. Dashed lines indicate the location of the pressure chambers 5 and ports 11 through which the reinforcing members pass are also shown. Bolts 16 or other suitable holding means are utilized to attach the pressure chambers to rear wall 15 of the extrusion zone. Entry ports 11 correspond to the cross sectional shape of the entering reinforcing members. Square openings 17 are provided in rear wall 15 to allow ports 11 to communicate with the extrusion zone and to allow the reinforcing members to gain entry into the extrusion zone. The front wall of the pressure chamber is abutted against the outside of rear wall 15. Thus, in operation when reinforcing members fill ports 11 and pressure chambers 5 are pressurized, extrudent cannot escape from the rear or upstream end of the extrusion zone.

The ports through which reinforcing members pass should be only slightly larger in cross section than the entering reinforcing member in order to prevent pressure loss. However, their tolerance need not be nearly so exact as it must be in prior art wire coating processes. Essentially, when the pressure chambers are pressurized, gas enters thereinto and has no convenient place from which to escape and pressure is built up. Some gas does, however, escape both into the extrusion zone and out through the rear ports in the pressure chambers. Therefore, gas from the pressurizing means must be continually applied during an extrusion operation.

The reinforcing members utilized to reinforce a specific area of any given article may be of many designs and shapes. In an article such as the air cargo pallet described above, the reinforcing members may be either completely solid, or they may be fabricated of webbed, perforated or woven screenlike material. The type and structure of the material used depends upon the article that is to be reinforced and how much added strength is to be imparted by the reinforcement.

A second specific example which illustrates another embodiment of this invention is shown in FIGS. 5, 6, and 7 of the drawing.

FIG. 5 is a side elevational view of an extrusion zone 9. A flat sheet 21 of material reinforced with reinforcing member 22 is shown protruding from a die in the front of extrusion zone 9.

FIG. 6 is a view taken along line 6—6 of FIG. 5. As in the previous example, extrudent enters extrusion zone 9 through passageway 10. However, in this example the reinforcing member 22 is a sheet of flexible, screenlike material. It enters the extrusion zone through a slot in the bottom thereof, passes upwardly through the slot until it is approximately half way to the top of the extrusion zone, and then curves and exits through the die in the front of the extrusion zone. Thus, the design of the series or plurality of smaller passageways 23 and 24 must be slightly different than that used in the apparatus of FIG. 2. In this case, passageways 23 receive extrudent from main passageway 10 and deposit it on top of reinforcing member 22 while passageways 24 receive extrudent and circle around to deposit it below the reinforcing member.

FIG. 7 is a view taken along lines 7—7 of FIG. 6 and further illustrates how reinforcing member 22 is removed from a roll 25 below the extrusion zone, passes upwardly through pressure chamber 5 into the underside of extrusion zone 9, continues to travel upwardly until it reaches point 26 located within the extrusion zone, and then curves to be encompassed by extrudent 21 and pass out of the extrusion zone through the die.

It is seen from the above description that the techniques described can be used to reinforce any portion of any extrudible article. Dies of an infinite number of sizes and shapes may be designed to obtain a reinforced article having a desired configuration.

Many combinations of extrudent and reinforcing member may be utilized in carrying out the process of this invention. For example, the extrudent may be a thermoplastic polymeric material such as polyvinyl chloride and the reinforcing member or members may be of aluminum or the extrudent may be aluminum and the reinforcing material titanium or steel. It is necessary that the reinforcing material have a higher softening point or plastic deformation point than the extrudent. This is necessary because the reinforcing member is not extruded but only forced through a die by surrounding extrudent.

In carrying out extrusions, extrudent is heated to a temperature called the plastic deformation point before being delivered to the extrusion zone and forced through the die. Heating means in the extruder is utilized. The term plastic deformation point, therefore, means that temperature to which a given material must be heated to enable it to be forced through a given die. The plastic deformation point, of course, varies with the material being extruded and may also vary with the shape and size of the die. It is, however, in most cases considerably lower than the melting point of the extrudent. That is, materials being extruded are generally not molten. They are only heated enough so that they are softened and can be forced through a die.

Prior to actually inserting a reinforcing member into the extrusion zone to start an extrusion process, it is preferred that the reinforcing member, if it is metallic, be preheated. Preheating of metallic reinforcing members is preferred because if heated extrudent were brought into contact with a cool reinforcing member some crystallization of the extrudent around the surface of the member might occur. In order to avoid this problem, the reinforcing member or members should be preheated to a temperature corresponding to the plastic deformation point of the extrudent. Preheating may be easily accomplished by passing the reinforcing member through heating coils prior to inserting it through the pressure chamber.

It may also be desirable to subject reinforcing members to a cleaning solution or bath prior to their entry into the extrusion zone. This, as in the case of preheating, may be easily accomplished by prior art methods.

FIGS. 1–4 above concern the fabrication of an extruded article containing solid, non-weblike reinforcing members. On the other hand, FIGS. 5–7 concern the fabrication of a reinforced article in which the reinforcing member is webbed or screenlike. A screenlike reinforcing member may be either a solid sheet of material with openings punched or drilled in it or a screen woven from a plurality of wires.

In practicing this invention, it is preferred that the reinforcing member be screenlike. When a reinforcing member and extrudent come together in the extrusion zone both are, of course, heated. Consequently both are expanded. The extrudent, having a somewhat lower melting point than the reinforcing member also has a higher coefficient of expansion and, therefore, expands more than the reinforcing member. Thus, when the reinforced article is cooled upon emerging from the extrusion zone, the extrudent shrinks more than the reinforcing member. If openings are provided, as in a screenlike or webbed reinforcing member, the extrudent shrinks inwardly against itself through the openings and forms extremely strong bonds both to itself and to the reinforcing member forming a prestressed item. It is for this reason that webbed, screenlike reinforcing members are preferred.

I claim:
1. A process for manufacturing reinforced extruded articles, said process comprising the steps of:
   a. introducing at least one reinforcing member into a pressure chamber and from thence into and through an extrusion zone through an entry port leading from the pressure chamber to the extrusion zone;
   b. introducing extrudent from an extruder, heated to its plastic deformation temperature, into said extrusion zone from the rear thereof;
   c. flowing said extrudent through passageways in said extrusion zone so that said extrudent surrounds said reinforcing member;
   d. pressurizing said pressure chamber to prevent extrudent from escaping from said extrusion zone through said entry port; and
   e. forcing said extrudent through a die in the extrusion zone, thereby exerting pressure on said reinforcing member and causing said reinforcing member to be carried through said die along with said extrudent.

2. A process according to claim 1 wherein said reinforcing member is a woven material having a higher melting point than said extrudent.

3. A process according to claim 1 wherein said reinforcing member is a perforated sheet having a higher melting point than said extrudent.

4. A process according to claim 1 wherein said extrudent is a thermoplastic polymeric material and wherein said reinforcing member is formed of a metal having a higher melting point than said extrudent.

5. A process according to claim 1 wherein said extrudent is a metal and wherein said reinforcing member is a metal reinforcing member having a higher melting point than said extrudent.

6. A process according to claim 4 wherein said extrudent is aluminum and said reinforcing member is selected from the group consisting of titanium and steel.

7. A process according to claim 1 wherein a prestressed extruded article is formed by utilizing a woven reinforcing member.

8. A process according to claim 1 wherein a prestressed extruded article is formed by utilizing a perforated material as a reinforcing member.

* * * * *